United States Patent [19]
Anderson

[11] Patent Number: 4,879,936
[45] Date of Patent: Nov. 14, 1989

[54] CIRCULAR SAW BLADE HAVING REMOVABLE TEETH

[76] Inventor: Donald Anderson, P.O. Box 886, Crooked River Ranch, Oreg. 97760

[21] Appl. No.: 85,019

[22] Filed: Aug. 13, 1987

[51] Int. Cl.$^4$ .................... B27B 33/08; B23D 61/06
[52] U.S. Cl. ................................. 83/842; 83/841; 83/839; 83/835
[58] Field of Search ............... 83/841, 839, 840, 842, 83/835, 843, 844, 845

[56] References Cited

U.S. PATENT DOCUMENTS

| | | | |
|---|---|---|---|
| 561,098 | 6/1896 | Emerson | 83/842 |
| 565,288 | 8/1896 | Luce | 83/840 |
| 1,239,459 | 9/1917 | Carew | |
| 3,455,001 | 7/1969 | Sirola | 29/96 |
| 3,500,522 | 3/1970 | Stier | 29/96 |
| 3,646,649 | 3/1972 | Oaks et al. | 29/96 |
| 4,084,470 | 4/1978 | Reed | 83/841 |
| 4,247,231 | 1/1981 | Kraemer | 407/101 |
| 4,332,513 | 6/1982 | Gowanlock | 407/101 |
| 4,422,812 | 12/1983 | Linville | 408/204 |
| 4,744,278 | 5/1988 | Wright | 83/839 |

FOREIGN PATENT DOCUMENTS

| | | | |
|---|---|---|---|
| 873127 | 6/1971 | Canada | 143/76 |
| 964557 | 3/1975 | Canada | 143/76 |
| 0040218 | 3/1983 | Japan | 407/47 |

OTHER PUBLICATIONS

One sheet of a brochure published by IKS-ACTON entitled CLEVISAW, Jan. 14, 1986.

Primary Examiner—Donald R. Schran
Attorney, Agent, or Firm—Jack M. Wiseman

[57] ABSTRACT

A circular saw blade in which tooth assemblies are pivotally mounted along the periphery of the disc spaced apart at equal angular distances. Each tooth assembly has a U-shaped tooth wedging member pivotally mounted on the disc. The tooth is secured between the disc and the wedging member. Pivotal movement of the tooth wedging member in one direction wedges the tooth between the disc and the tooth wedging member. Pivotal movement of the tooth wedging member in an opposite direction releases the tooth from the wedging action between the disc and the wedging member. A cam locking member is rotatably mounted on the disc adjacent the wedging member. Rotation of the cam locking member in one direction locks the tooth wedging member in the tooth wedging mode. Rotation of the cam locking member in an opposite direction unlocks the tooth wedging member to enable the tooth to be released from the wedging action between the disc and the tooth wedging member.

4 Claims, 3 Drawing Sheets

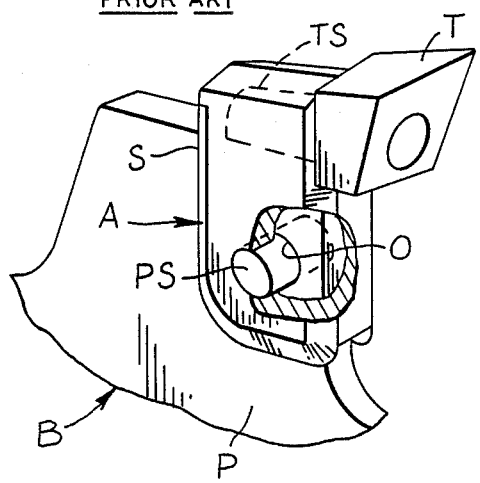
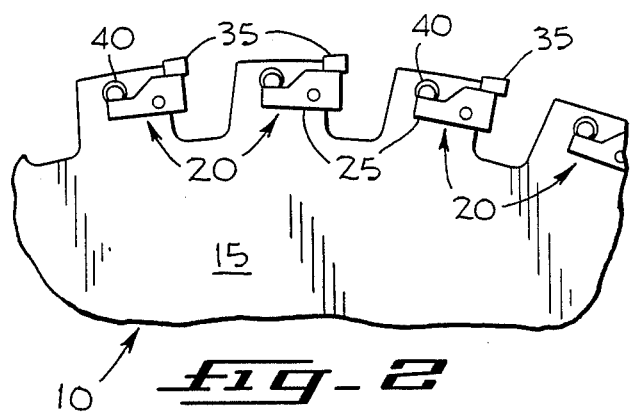
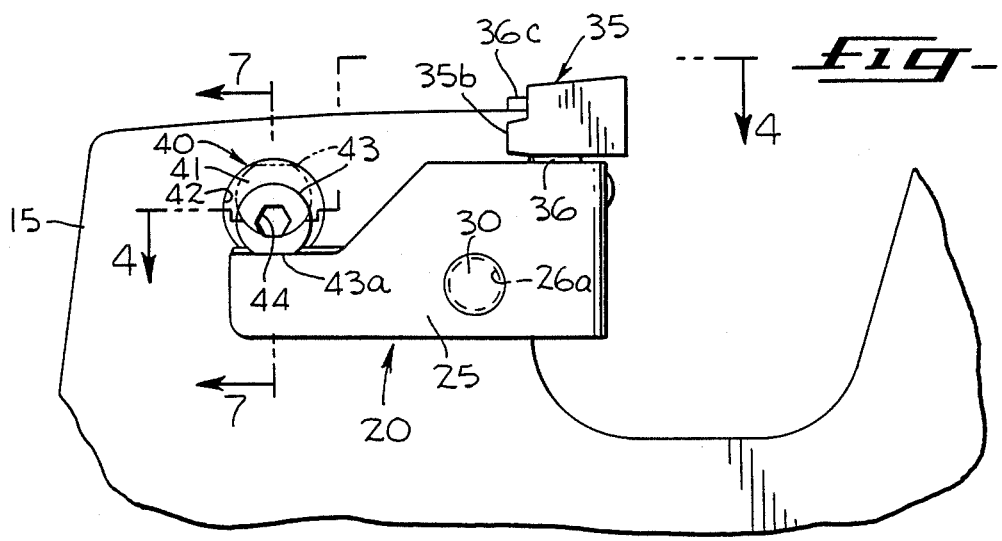
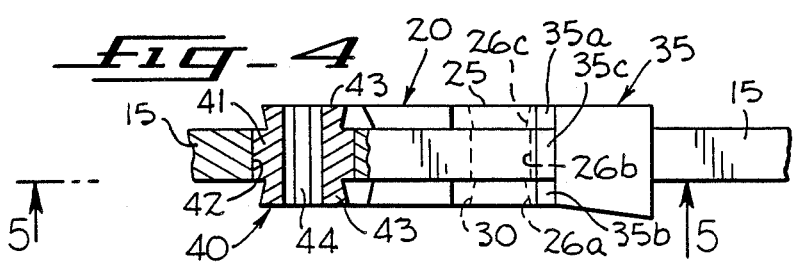
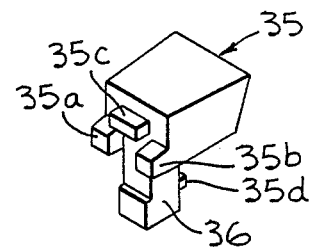
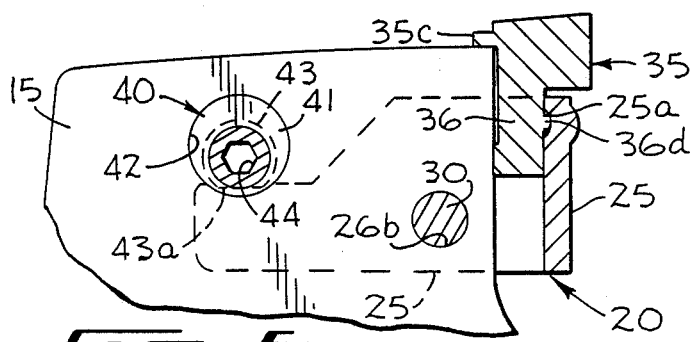
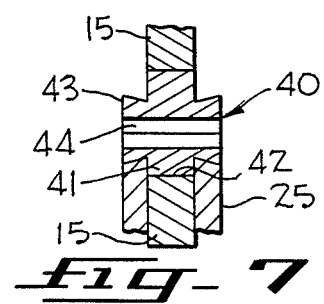

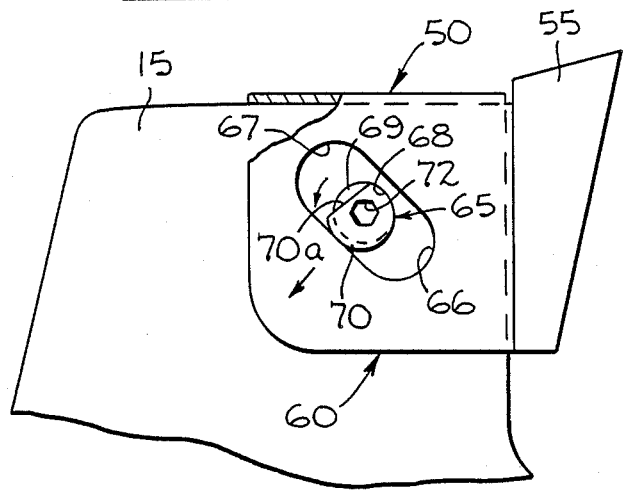
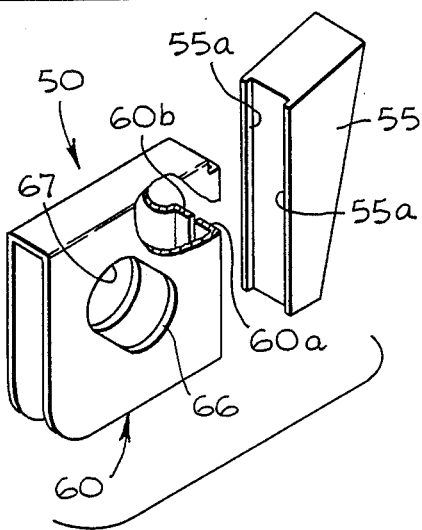
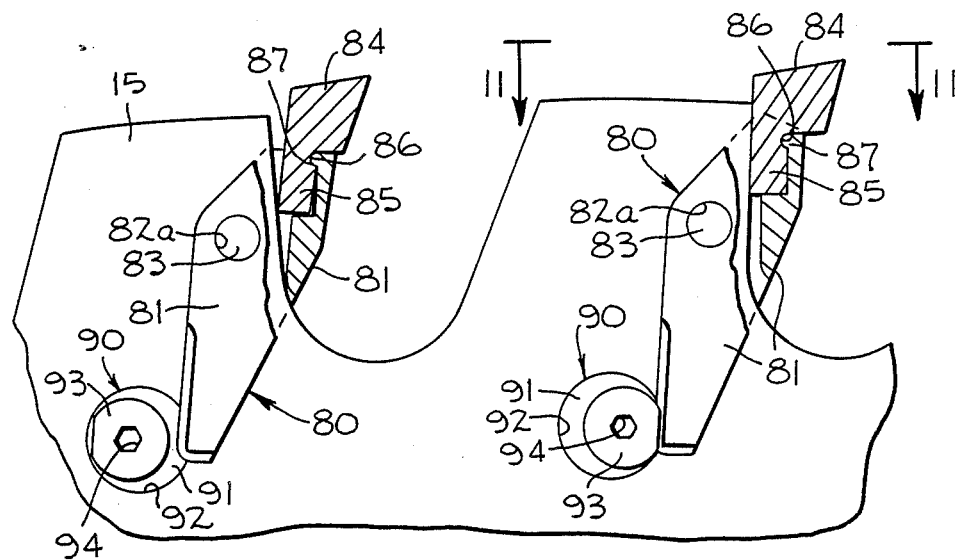
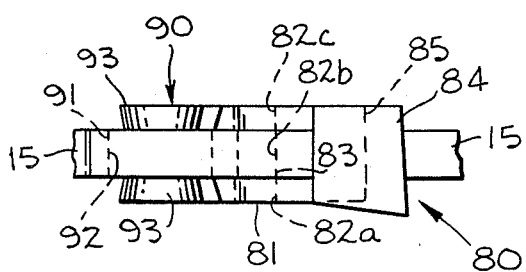
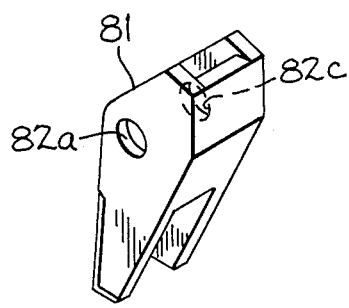

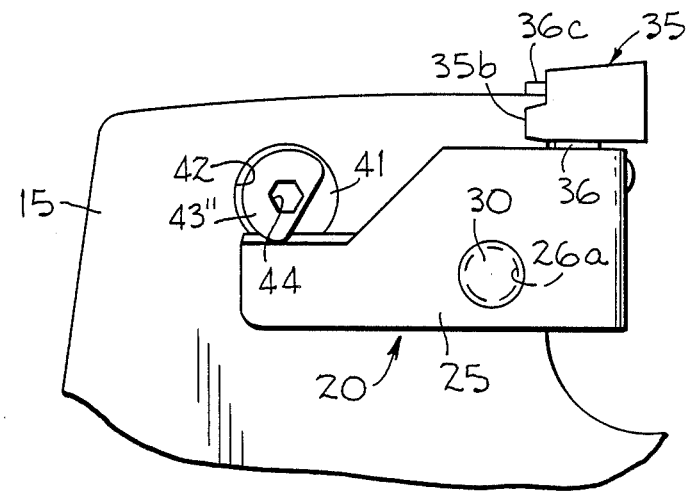
fig_13
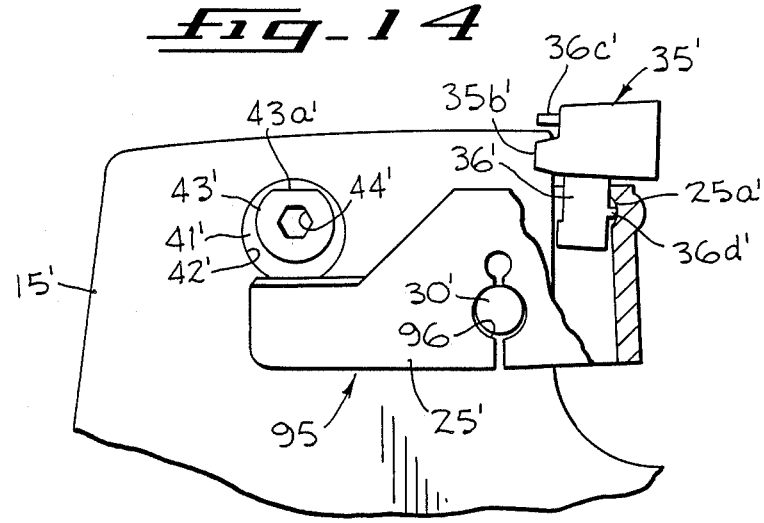
fig_14
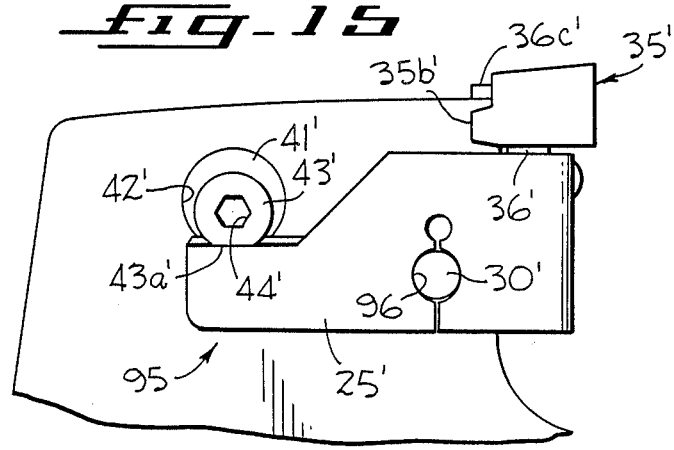
fig_15

CIRCULAR SAW BLADE HAVING REMOVABLE TEETH

BACKGROND OF THE INVENTION

The present invention relates in general to circular saw blades, and more particularly to a circular saw blade having removable teeth.

Heretofore, the teeth of a circular saw blade were riveted or swaged to the disc. Such a saw blade was continuously retensioned which resulted in the loosening of the teeth. Consequently, the rivets or the swaging arrangement had to be tensioned, which had an adverse effect on the tension of the saw blade. Subsequently, a rigid support member was employed to removably secure a tooth with a tapered shank to the disc of a saw blade. The rigid support member was secured to the disc by a press fitted pin. The tapered shank of the tooth was wedged between the rigid support member and the disc and was removable therefrom by a hammer urging the shank to move in the direction to unwedge the shank.

A circular saw has been manufactured and sold in which a tooth with a tapered shank was wedged between a rigid support member and a disc and the rigid support member was secured to the disc of the saw blade by means of a press fitted pin. The tooth was removed by a hammer urging the tapered shank of the tooth to move in a direction to unwedge the shank.

The U.S. Pat. No. No. 1,239,459, to Carew, issued on Sept. 11, 1917, for Tool and Tool Holder, discloses a shank of a tool holder and a tool having a cutting face. The tool is removably secured to the tool holder through a rotary cam.

The U.S. Pat. No. 3,455,001, to Sirola, issued on July 15, 1969, for Cut-Off Tool, discloses a cut-off tool adapted to be secured in the tool post of a lathe. A cutter element is mounted on the holder of the cut-off tool. The holder is provided with a clamping member pivotally mounted on the holder through a pin. The movement of the clamping member releasably secures the cutter element to the holder. Camming members on the holder control the movement of the clamping member for releasably securing the cutter element to the holder.

In the U.S. Pat. No. 3,500,522, to Stier, issued on Mar. 17, 1970, for a Cutoff Tool Holder, there is disclosed a cutoff tool holder in which a cutting element is releasably secured to a blade. A pivotally mounted clamping member releasably secures the cutting element to the blade. A cam lock controls the movement of the clamping member for releasably securing the cutting element to the blade.

The U.S. Pat. No. 3,646,649, to Oaks et al., for Grooving And Cutoff Tool, discloses a grooving and cutoff tool in which a support element projects from a support block. A cutting element seats in a groove of the support element. A clamping lever arm is pivotally mounted on the support block for releasably engaging the cutting element for releasably holding the cutting element in the recess of the support element. A screw pivots the clamping lever arm for releasably holding the cutting element in the recess of the support element.

The U.S. Pat. No. 4,247,231, to Kraemer, issued on Jan. 27, 1981, for Tool Holder, discloses a tool holder for grooving and parting machining operations. The tool holder comprises a support body. A support plate is mounted on the support body. Formed in the support plate is a recess in which seats a removable cutting element. A clamp assembly is removably secured to the clamp body for removably securing the cutting element within the recess of the support plate.

In the U.S. Pat. No. 4,332,513, Gowanlock, for Face Grooving Tool, there is disclosed a face grooving tool for machining circular grooves in a metal workpiece. The face grooving tool comprises a shaft. Mounted on the shaft is a removable cutting element holder. The holder is formed with a groove within which is seated the cutting element. A clamp is removably secured to the holder for retaining the cutting element in the groove of the holder.

In the U.S. Pat. No. 4,422,812, to Linvolle, issued on Dec. 27, 1983, for Rotatable Shell Cutter, there is disclosed a shell cutter for cutting an opening in a pipe. The shell cutter comprises a tubular member that is rotatable by a drill shaft. Along the perimeter of the tubular member are cutting assemblies. Each cutting assembly includes a cartridge, a cutting element carried by the cartridge and a clamp that removably secures the cutting element to the cartridge. The clamp is removably secured to the cartridge by a screw.

The U.S. Pat. No. 4,084,470, to Reed, issued on Apr. 18, 1978, for Carbide Tipped Insertable Saw Tooth, discloses an insertable tooth for use in a slasher for paper pulp. The tooth is insertable into a slot formed in a saw plate. One or more rivets secure the tooth within the slot formed in the saw plate.

SUMMARY OF THE INVENTION

A saw blade comprises a saw plate. Spaced along the perimeter of the saw plate are tooth assemblies. Each tooth assembly comprises a pivotal tooth retaining member pivotally mounted on the saw plate along the perimeter thereof. Removably secured between the pivotal tooth retaining member and the saw plate and projecting outwardly from the saw plate is a tooth. The tooth is removably secured between the saw plate and the tooth retaining member by the pivotal movement of the tooth retaining member. For releasably locking the pivotal tooth retaining member to the saw plate, a cam locking member is rotatably mounted on the saw plate for movement into and out of locking engagement with the pivotal tooth retaining member.

An object of the present invention is to provide an arrangement in which the teeth of a saw blade can be removed from and replaced on the saw plate of the saw blade with facility and ease of operation.

Another object of the present invention is to provide an arrangement in which the teeth of a saw blade can be removed from and replaced on the saw plate of the saw blade relatively rapidly and with reduced consumption of time.

A feature of the present invention is the removal of a tooth from a saw blade can be performed through the use of a cam locking member actuated by an Allen wrench.

Another feature of the present invention is that the removal of a tooth from a saw blade can be carried out by the pivotal movement of a tooth retaining member.

DESCRIPTION OF THE DRAWINGS

FIG. 1 is a fragmentary, diagrammatic perspective view of a circular saw blade with removable tooth assemblies illustrating a prior art arrangement for a circular saw blade.

FIG. 2 is a fragmentary, elevational view of a circular saw blade embodying the present invention.

FIG. 3 is an elevational view of a pivotal tooth assembly for the circular saw blade shown in FIG. 2 illustrated pivotally mounted on a sector of a disc of the circular saw blade.

FIG. 4 is a vertical sectional view shown partially in plan of the removable tooth assembly shown in FIG. 3 taken along line 4—4 of FIG. 3 and illustrated with a sector of the circular saw blade.

FIG. 5 is a vertical section view shown partially in elevation taken along line 5—5 of FIG. 4.

FIG. 6 is a perspective view of a tooth employed in the circular saw blade shown in FIGS. 2-5.

FIG. 7 is a sectional view taken along line 7—7 of FIG. 3.

FIG. 8 is an elevational view partially broken away of a modification of the pivotal tooth assembly shown in FIGS. 2-5, illustrated with a sector of the disc of the circular saw blade.

FIG. 9 is a fragmentary, exploded view partially broken away of the tooth assembly shown in FIG. 8.

FIG. 10 is an elevational view partially in section of another modification of the pivotal tooth assembly shown in FIGS. 2-5 illustrated with a sector of the disc of the circular saw blade.

FIG. 11 is a plan view of the pivotal tooth assembly shown in FIG. 10 taken along line 11 of FIG. 10 and illustrated with a sector of the disc of the circular saw blade.

FIG. 12 is a perspective view of the tooth retaining member employed in the pivotal tooth assembly shown in FIG. 11.

FIG. 13 is a view similar to FIG. 3, illustrating a modified cam structure for releasably locking a tooth retaining member.

FIG. 14 is an elevational view of a further modification of the pivotal tooth assembly shown in FIGS. 2-5 illustrating the removal of a tightening action against a pivot pin when the tooth assembly is in a tooth release mode.

FIG. 15 is an elevation view of the pivotal tooth assembly shown in FIG. 14 illustrating the tightening action against the pivot pin when the tooth assembly is in a tooth locking mode.

DETAILED DESCRIPTION OF THE PREFERRED EMBODIMENTS

Illustrated in FIG. 1 is a circular saw blade B with a removable tooth assembly A illustrating in particular a prior art arrangement for a removable tooth assembly. The saw blade B comprises a disc P. Mounted on the disc P along the perimeter thereof is a rigid, U-shaped support member S. The U-shaped support member S is removably secured to the disc P by a press fitted pin PS that is press fitted into aligned cylindrical openings O formed in the support member S and the disc P. Wedged between the support member S and the disc P is a suitable tooth T. The tooth T is wedged between the disc P and the rigid support member S by a tapered shank TS. For removing the support member S from the disc P in order to remove the tooth wedged between the support member S and the disc P, a hammer is used to urge the tapered shank to move in a direction to unwedge the shank. For mounting the support member S onto the disc P, in order to wedge the tooth therebetween, the U-shaped support member S embraces the perimeter of the disc P with the cylindrical opening of the disc P aligned with the confronting openings in the U-shaped support member S. Thereupon, the pin PS is press fitted into the aligned openings O by a hammer.

Illustrated in FIG. 2 is preferably a circular saw 10 embodying the present invention comprising preferably a disc or a circular saw plate 15. Pivotally mounted on the disc 15 along the perimeter of the disc 15 are a plurality of tooth assemblies 20. The tooth assemblies 20 are spaced apart equal angular distances along the perimeter of the disc 15. The disc 15 is formed with suitable valleys and ridges or lugs along the perimetric edge thereof to reduce plate twisting and to minimize plate cracks. The tooth assemblies 20 are respectively mounted on the ridges or lugs of the disc 15.

Each tooth assembly 20 (FIGS. 3-5) comprises, in the preferred embodiment, a pivotal, lever-type, U-shaped clamp or tooth retaining member 25 that receives the associated ridge or lug of the disc 15. The U-shaped tooth retaining member 25 or bifurcated clamp is rigid and, in the exemplary embodiment is made of spring steel. The legs of the pivotal U-shaped tooth retaining member 25 engage the oppositely directed planar faces of the disc 15 and the interconnection of the U-shaped retaining member 25 faces in spaced relation the end of the associated lug or ridge of the disc 15. Formed in the U-shaped retaining member 25 and the disc 15 are aligned cylindrical openings 26a, 26b and 26c. Disposed within the cylindrical openings 26a–26c is a pin 30 or a suitable rivet. In the exemplary embodiment, the pin 30 has a chamfer or beveled edges (FIG. 4) along the outer extremities thereof for holding the pin 30 within the cylindrical openings 26a–26c. The retaining member 25 pivots relative to the disc 15 and need not be removed from the disc 15.

Wedged between the disc 15 and the U-shaped retaining member 25 is a suitable tooth 35 for a circular saw blade. The tooth 35 projects radially outward from the disc 15 beyond the associated ridge or lug. The tooth 35 includes a shank 36 that is wedged between the U-shaped retaining member 25 and the disc 15 at the associated ridge or lug. In the preferred embodiment, the shank 36 does not have a taper. The tooth 35 (FIGS. 5 and 6) is formed with parallel flanges 35a and 35b, which engage the planar faces of the disc 15 and an intermediate flange 36c that engages the confronting end of the associated ridge of the disc 15. Also the shank 36 of the tooth 35 is formed with an arcuate rib 36d that is received by a contour conforming recess 25a formed in the U-shaped retaining member 25. Thus, the tooth 35 has a multiple point clamping action in addition to it being wedged between the retaining member 25 and the disc 15.

While the exemplary embodiment employs an arcuate locking rib 36d of the shank 36 received by a complementary recess 25a formed in the retaining member 25, it is within the contemplation of the present invention that an arcuate rib be formed in the opposite parallel wall of the shank which is received by a complementary recess formed in the confronting wall of the disc 15. This arrangement would be in lieu of the illustrated exemplary embodiment.

Pivotal movement of the retaining member 25 about the pin 30 in one direction relative to the disc 15 locks the shank 36 of the tooth 35 between the retaining member 25 and disc 15. Pivotal movement of the retaining member 25 about the pin 30 in an opposite direction relative to the disc 15 releases the shank 36 of the tooth 35, thus enabling the tooth 35 to be removed and to be replaced by another tooth or after being sharpened or repaired.

For releasably locking the retaining member 25 to the disc 15 in the tooth retaining mode, a cam locking member 40 is rotatably mounted on the disc 15 adjacent to the retaining member 25. The cam locking member 40 comprises a cylindrical body 41 that is rotatable within a substantially cylindrical opening 42 formed within the disc 15. At each end of the cylindrical body 41 is a cam 43. An axial opening 44 formed in the body 41 of the cam locking member 40 is preferably suitable for receiving an Allen wrench.

By rotating the cam locking member 40 in one direction, preferably through an Allen wrench, the cams 43 engage the confronting wall of the retaining member 25 for locking the retaining member 25 to the disc 15 in the tooth retaining mode. By rotating the cam locking member 40 in an opposite direction, preferably through an Allen wrench, the cams 43 release the retaining member 25. The retaining member 25 is thereby pivotal about the pin 30, thus enabling the tooth 35 to be removed from the space between the retaining member 25 and the disc 15. While the retaining member 25 is in a tooth release mode, the tooth 35 or a similar tooth may be disposed between the retaining member 25 and the disc 15. Then, the retaining member 25 is rotated about the pin 30 to wedge the shank 36 of the tooth 35 between the disc 15 and the retaining member 25. The cams 43 are rotated either in a clockwise or counter-clockwise direction to lock the retaining member 25 to the disc 15 in the tooth locking mode.

There are various ways of employing the cams 43 to lock the retaining member 25. In one embodiment, each cam 43 includes a linear surface or a detent 43a. The cams 43 are configured so that the detents 43a abut against the confronting walls of the spring steel retaining member 25 during the locking mode. The yieldable action of the spring steel retaining member 25 accommodates the locking action of the linear surfaces of the dents 43a thereagainst. The cams 43 in the tooth locking mode snap into place. In the release mode, the detents 43a are displaced so that there is space between the cams 43 and the retaining member 25. In the release mode, the cams 43 are rotated so that the flat surfaces 43a are spaced from the confronting walls of the retaining member 25. In another embodiment, cams 43" (FIG. 13) are configured so that the arcuate walls of the cams 43 contact the confronting walls of the spring steel retaining member 25 in locking engagement during the locking mode. To release the retaining member, in the other embodiment, the cams 43" are rotated so that there is a space between the arcuate walls of the cams 43' and the confronting walls of the retaining member 25.

Illustrated in FIGS. 8 and 9 is a tooth assembly 50, which is a modification of the tooth assembly 20 shown in FIGS. 3-5. The tooth assembly 50 is movably secured to the disc saw plate 15 along the perimeter thereof and a well-known tooth 55 suitable for a circular saw is secured to the tooth assembly 50. The tooth assembly 50 comprises a U-shaped or bifurcated tooth holding member 60 that is removably secured to the associated ridge of the disc 15. In the exemplary embodiment, the holding member 60 is rigid and made of spring steel.

The legs of the U-shaped tooth holding member 60 engage the oppositely directed planar faces of the disc 15. The connecting piece of the U-shaped tooth holding member 60 abuts against the confronting peripheral wall of the disc 15. The tooth 55, in the exemplary embodiment, has a channel-shaped inner wall 55a gripping flanges 60a and 60b of the tooth holding member 60 and the tooth 55 is welded to the flanges 60a and 60b for securing the tooth 55 to the tooth holding member 60.

For releasably securing the tooth holding member 60 to the disc 15, a cam locking member 65 is provided. Formed in the legs of the U-shaped tooth holding member 60 are slots 66 and 67. Formed in the disc 15 in alignment with the slots 66 and 67 of the U-shaped tooth holding member 60 is a cylindrical opening 68. Disposed in the cylindrical opening 68 of the disc 15 is a cylindrical body 69 of the cam locking member 65. At opposite ends of the cylindrical body 69 are cams 70. The body 69, in the preferred embodiment, is formed with an axial opening 72 suitable for receiving an Allen wrench.

When the U-shaped tooth holding member 60 is disposed over the associated ridge of the disc 15, the tooth supporting member 60 is held in a releasably fixed position relative to the disc 15 by rotating the cams 70 until the cams 70 are in locking engagement with the respective walls of the holding member 60 surrounding the slots 66 and 67. To remove the tool holding member 60 from the disc 15, the cams 70 are rotated in an opposite direction disengaging the walls of the holding member 60 surrounding the slots 66 and 67, respectively.

The cams 70 are rotatable either in a clockwise direction or a counterclockwise direction to lock the holding member 60 to the disc 15 in a tooth locking mode. There are various ways of employing the cams 70 to lock the holding member 60. In one embodiment, the cams 70 are configured so that the arcuate walls of the cams 70 contact the confronting walls of the holding member 60 in locking engagement during the locking mode. In the release mode, the cams 70 are rotated so that the flat members 70a are spaced from the confronting walls of the holding member 60. In another embodiment, each cam includes a linear surface or a detent. The cams are configured so that the detents abut against the confronting walls of the holding member 60 during the locking mode. In the release mode, the detents are displaced so that there is space between the cams and the holding member 60.

Illustrated in FIGS. 10-12 are tooth assemblies 80 which are another modification of the tooth assembly 20 shown in FIGS. 3-5. Each tooth assembly 80 comprises a pivotal, lever-type, U-shaped tooth retaining member 81 that is disposed along the periphery of the disc 15 and receives the associated ridge or lug of the disc 15. The retaining or clamp member 81, in the exemplary embodiment, is rigid and made of spring steel. The tooth retaining member 81 engages the oppositely directed planar faces of the disc 15 and the connecting piece of the U-shaped tooth retaining member 81 faces in spaced relation the end of the associated lug or ridge of the disc 15. Formed in the U-shaped retaining member 81 and the disc 15 are aligned cylindrical openings 82a, 82b and 82c. Disposed within the cylindrical openings 82a-82c is a pin 83 or a suitable rivet. The tooth retaining member 81 pivots about the pin 83. In the preferred embodiment, the tooth retaining member 81 pivots relative to the disc 15 and need not be removable from the disc 15. In the exemplary embodiment, the pin 83 is chamfered or has tapered surfaces at the extremities thereof for holding the pin 83 within the openings 82a-82c.

Wedged between the disc 15 and the tooth retaining member 81 is a suitable tooth 84 for a circular saw blade. The tooth 84 projects radially outward from the disc 15 beyond the associated ridge or lug. The tooth 84 includes a shank 85 that is wedged between the tooth retaining member 81 and the disc 15 at the associated ridge or lug. The tooth 84 is formed with a recess 86 within the shank 85 confronting the connecting piece of the tooth retaining member 81. In turn, the connecting piece of the tooth retaining member 81 is formed with a complementary locking rib 87 that seats within the recess 86. The locking rib 87 of the tooth retaining member 81 and the recess 86 formed in the shank 85 of the tooth 84 enable the tooth 84 to be securely retained in the space between the tooth retaining member 81 and the disc 15.

Pivotal movement of the tooth retaining member 81 about the pin 83 in one direction relative to the disc 15 locks the shank 85 of the tooth 84 between the tooth retaining member 81 and the disc 15. See right hand tooth assembly 80 in FIG. 10. Pivotal movement of the tooth retaining member 81 about the pin 83 in an opposite direction relative to the disc 15 releases the shank 85 of the tooth 84, thus enabling the tooth 84 to be removed and to be replaced by another tooth after being sharpened or repaired. See left hand tooth assembly 80 in Figure 10.

For releasably locking the tooth retaining member 81 to the disc 15 in the tooth retaining mode, a cam locking member 90 is rotatably mounted on the saw plate 15 adjacent to the tooth retaining member 81. The cam locking member 90 comprises a cylindrical body 91 that is rotatable within a cylindrical opening 92 formed within the disc 15. At each end of the cylindrical body 91 is a cam 93. An axial opening 94 formed in the body 91 of the cam locking member 90 is preferably suitable for receiving an Allen wrench.

By rotating the cam locking member 90 in one direction, preferably through an Allen wrench, the cams 93 engage the confronting wall of the tooth retaining member 81 for locking the tooth retaining member 81 and the disc 15 in the tooth retaining mode. See right hand tooth assembly 80 in FIG. 10. By rotating the cam locking member 90 in an opposite direction, preferably through an Allen wrench, the cams 93 release the tooth retaining member 81. See left hand tooth assembly 80 in FIG. 10. The tooth retaining member 81 is thereby pivotal about the pin 83 relative to the disc 15, thus enabling the tooth 84 to be removed from the space between the tooth retaining member 81 and the disc 15. The cams 93 are rotatable either in a clockwise direction or a counterclockwise direction to lock the retaining member 81 to the disc 15 in a tooth locking mode. Each cam 93 may be formed with a linear surface or a detent so that the detent of each cam 93 will be disposed in locking engagement with the locking surface of the retaining member 81.

While the tooth retaining member 81 is in a tooth release mode 83, the tooth 84 or a similar tooth may be disposed between the tooth retaining member 81 and the disc 15. Then, the tooth retaining member 81 is rotated about the pin 83 to wedge the shank 85 of the tooth 84 between the disc 15 and the tooth retaining member 81. The cam 93 are rotated to lock the tooth retaining member 81 to the disc 15 in a tooth locking mode.

Illustrated in FIGS. 14 and 15 is a tooth assembly 95 which is a modification of the tooth assembly 20. Components of the tooth assembly 95 similar to the tooth assembly 20 are identified with the same reference numeral but with a prime suffix. In the tooth assembly 95, the engagement of the cam 40' with the spring steel retaining member 25' in the tooth locking mode causes the pivot pin 30' to be engaged by the wall surrounding a cylindrical opening 96 for exercising a tightening action against the pivot pin 30'. When the cam 40' releases the spring steel retaining member 25', the spring steel retaining member 25' assumes its initial position under its resilient action causing the wall surrounding the cylindrical opening 96 to loosen its engagement with the pivot pin 30'.

What is claimed is:

1. A circular saw blade comprising:
   (a) a disc having a periphery;
   (b) a tooth retaining member pivotally mounted on said disc along the periphery thereof;
   (c) a tooth disposed between said disc and said retaining member and extending radially from said disc beyond the periphery thereof, (d) said retaining member being pivotally movable between a tooth retaining position and a position removed from the tooth retaining position; and (e) cam locking means mounted on said disc adjacent said retaining member for releasably locking said retaining member to said disc in the tooth retaining position, (f) said tooth being wedged between said retaining member and said disc in response to said retaining member being in the tooth retaining position and said tooth being released in response to said retaining member being removed from the tooth retaining position, (g) said disc including a ridge having oppositely directed planar walls and a radially directed wall interconnecting the planar walls, and said retaining member being a U-shaped member having spaced parallel legs and an interconnection, said parallel legs of said U-shaped retaining member engaging said planar walls, respectively, of said ridge of said disc and said interconnection of said U-shaped retaining member confronting said radially directed wall of said ridge of said disc when said retaining member is in the tooth retaining position for wedging said tooth between said retaining member and said ridge of said disc, said cam locking means being arranged to engage said U-shaped retaining member for releasably locking said U-shaped retaining member in the tooth retaining position.

2. A circular saw blade comprising:
   (a) a disc having a periphery;
   (b) a tooth retaining member pivotally mounted on said disc along the periphery thereof;
   (c) a tooth disposed between said disc and said retaining member and extending radially from said disc beyond the periphery thereof,
   (d) said retaining member being pivotally movable between a tooth retaining position and a position removed from the tooth retaining position; and
   (e) cam locking means mounted on said disc adjacent said retaining member for releasably locking said retaining member to said disc in the tooth retaining position,
   (f) said disc including a ridge having oppositely directed planar walls and a radially directed wall interconnecting the planar walls, and said retaining member being a U-shaped member having spaced parallel legs and an interconnection, said parallel legs of said U-shaped retaining member engaging said planar walls, respectively, of said ridge of said disc and said interconnection of said U-shaped retaining member confronting said radial wall of said ridge of said disc when said retaining member is in the tooth retaining position for wedging said tooth between said retaining member and said ridge of said disc, said cam locking means being arranged to engage said U-shaped retaining member for releasably locking said U-shaped retaining member in the tooth retaining position.

3. A circular saw blade as claimed in claim 1 wherein said legs of said U-shaped retaining member are formed with aligned cylindrical openings and said disc is formed with a cylindrical opening aligned with the cylindrical openings formed in said legs of said U-shaped retaining member, said saw blade further comprising a pin received by said cylindrical opening formed in said disc and the cylindrical openings formed in said legs of said U-shaped retaining member, said U-shaped retaining member being mounted on said pin for pivotal movement relative to said disc.

4. A saw blade comprising:
(a) a saw plate;
(b) a tooth retaining member movably mounted on said saw plate along the periphery thereof;
(c) a tooth retained in position by said tooth retaining member and extending beyond the periphery of said saw plate; and
(d) rotatable cam locking means mounted on said saw plate for releasably locking said tooth retaining member in the tooth retaining position on said saw plate,
(e) said tooth retaining member having a U-shaped configuration with spaced parallel legs and an interconnection, said saw plate having oppositely directed planar walls and an interconnecting wall, said legs of said U-shaped retaining member engaging said planar walls of said saw plate and said interconnection of said U-shaped retaining member confronting said interconnecting wall of said saw plate, said cam locking means being arranged to engage said U-shaped tooth retaining member for releasably locking said U-shaped tooth retaining member in the tooth retaining position on said saw plate.

* * * * *